June 5, 1956  A. O. WILLIAMS  2,748,722
DIAGONALLY EQUALIZED RAIL TRUCK
Original Filed Feb. 27, 1948  2 Sheets-Sheet 1
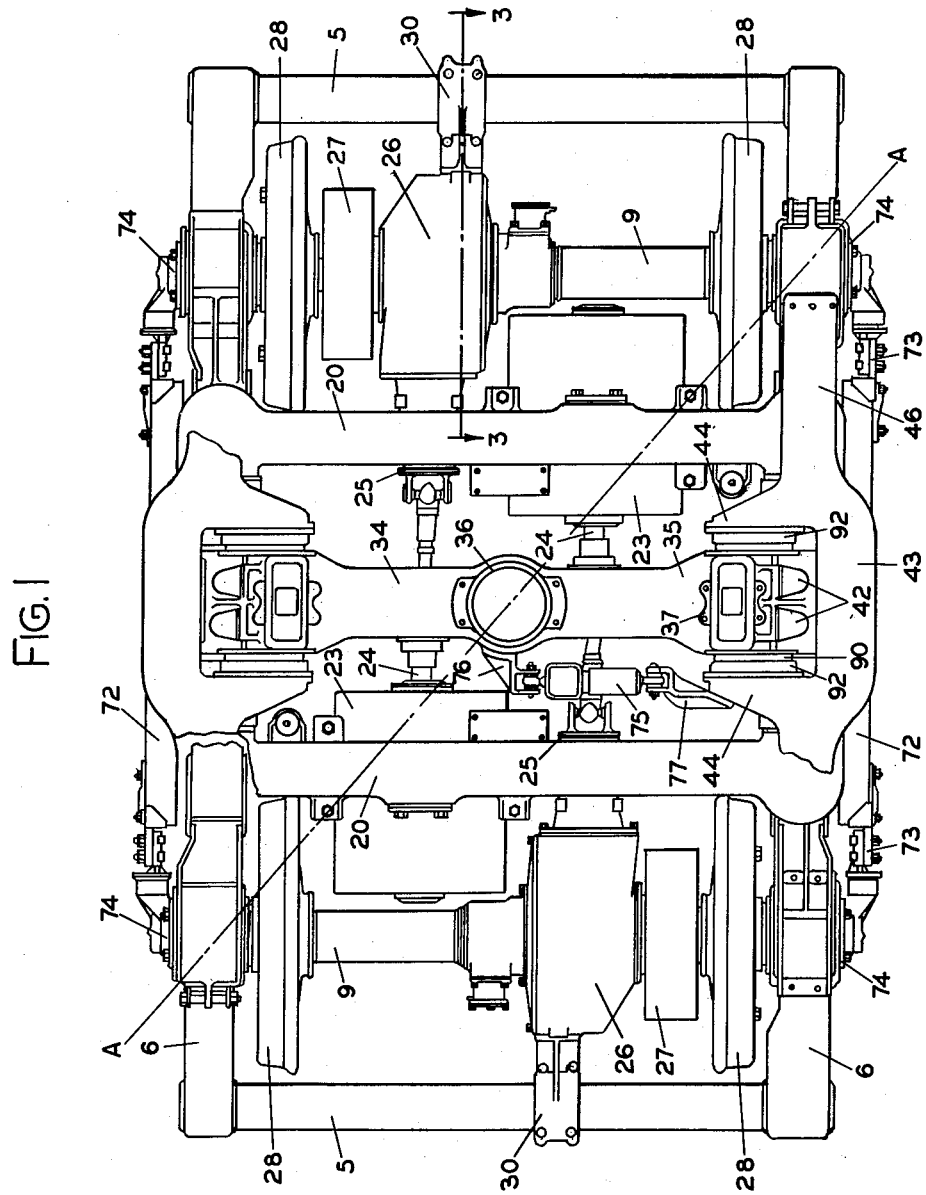
INVENTOR.
ALFRED O. WILLIAMS
BY Walter E. Shirmer
ATTY.

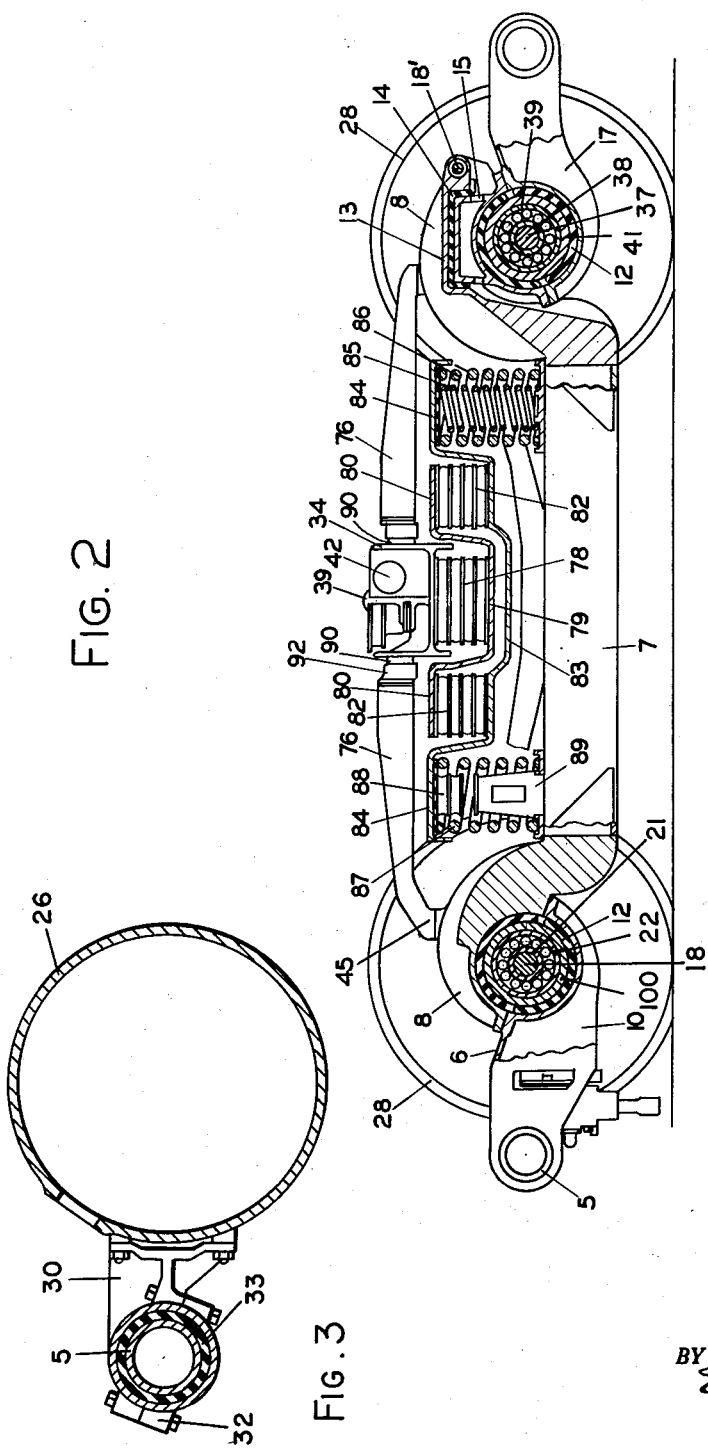

United States Patent Office 2,748,722
Patented June 5, 1956

2,748,722

DIAGONALLY EQUALIZED RAIL TRUCK

Alfred O. Williams, Battle Creek, Mich., assignor to Clark Equipment Company, Buchanan, Mich., a corporation of Michigan Original application February 27, 1948, Serial No. 11,411, now Patent No. 2,561,541, dated July 24, 1951. Divided and this application September 22, 1948, Serial No. 50,575

4 Claims. (Cl. 105—194)

This invention relates to rail car trucks and more particularly is concerned with a rail car truck for use on street railways, elevated lines, and subways. The present application is a division of my co-pending application Serial #11,411, filed February 27, 1948, now Patent 2,561,549 issued July 24, 1951.

With high speed operation of such vehicles, it is desirable that stability be provided for the axles of the truck to prevent rocking of the vehicle under high speed when track irregularities are encountered. For this reason, the present invention contemplates a truck in which the axles are held in absolute parallelism by a rectangular frame construction which is disposed about the outboard side of the wheels and has elements thereof extending transversely of the truck beyond the wheels.

Another feature of the present invention is the provision of means for allowing, at diagonally opposed points in the truck, relative movement of the axle with respect to the truck frame, whereby vertical irregularities in the track can be negotiated by the truck without imparting twisting and bending stresses to the truck frame.

Other objects and advantages of the present invention will appear more fully from the following detailed description, which, taken in conjunction with the accompanying drawings, will disclose to those skilled in the art, the particular construction and operation of preferred forms of the present invention.

In the drawings:

Figure 1 is a top plan view of a truck construction embodying the present invention.

Figure 2 is a side elevational view partly in section, of the truck shown in Figure 1.

Figure 3 is a sectional view taken on line 3—3 of Figure 1.

Referring now in detail to the drawings, there is provided a truck having a rectangular frame construction consisting of two transverse end elements 5, preferably in the form of tubular cross members which are secured in the extending ends of the side frame members 6 as by welding or the like. Each of the side frame members 6 comprises a substantially tubular dropped central portion 7, having arched end portions 8, extending over the projecting shafts which extend out of the axle housing, indicated generally at 9.

These arched portions 8, at one pair of diagonal corners of the main frame, are adapted to be clamped directly to the corresponding end portions 10 of the side frame elements, about the ends of the transverse axles 18 and 37. As best shown in Figure 2, the inner race 21 of a bearing assembly is mounted on the end of the axle 18 and concentrically disposed about the outer race 22 of the bearing assembly is a cylindrical journal housing 100. Interposed between the housing 100 and the frame elements 8 and 10 is a resilient bushing or sleeve member 12. The aforedescribed mounting of the frame elements 8 and 10 about the axle 18 maintains the axle 18 at right angles with respect to the frame while permitting limited rotation to take place between the axle 18 and frame elements 8 and 10. A similar mounting is provided at the opposite diagonal corner of the truck for supporting the frame 6 on the end of the axle 37.

At the opposite end of the side frame member 7, the arched portion 8, thereof, terminates in an inverted basket shaped portion 13, which receives an inverted cup shaped rubber cushioning element 14, seated over an extending boss 15, formed as half of a bracket supported by the axle 37.

The member 15 is secured to an extension member 17, projecting forwardly of the truck, about the axle 37. The inner race 38 of a bearing assembly is mounted on the end of the axle 37 and concentrically disposed about the outer race 39 of the bearing assembly is a cylindrical journal housing 41. Interposed between the housing 41 and the frame elements 15 and 17 is a resilient bushing or sleeve member 12. The inverted basket shaped portion 13 is pivotally mounted to the extending boss 15 by means of a safety or retaining pin 18'.

From the foregoing description, it will be observed that although the axle 37 is maintained at right angles with respect to the extension member 17, relative rotation between the members 13 and 15 is permitted, thus providing a resilient and flexible joint in the truck frame which will accommodate vertical movement of one end of the axle. The frame 6 is mounted in a similar manner to the axle 18 at the opposite diagonal corner of the truck.

By providing flexible joints between the axles and truck frame at opposite diagonal corners thereof, the truck is hinged or articulated about the center line A—A, as shown in Figure 1. If the truck is raised at either or both of the diagonal corners of the truck adjacent the flexible joints, the frame will hinge along line A—A leaving the wheels adjacent the opposite pair of diagonal corners on the rails. If the truck is raised at either or both of the diagonal corners of the truck, adjacent the fixed connections between frame and axle, the frame will also hinge along line A—A leaving the wheels adjacent the flexible joints on the rails.

Extending between the two side frame members 7 transversely of the truck is a substantially rectangular sub-frame member, including the transverse cross frames 20, which at their ends are interconnected by a depending normally extending end member 83, having cap portions 84, forming a depending cradle element. Intermediate their ends, the members 20 have opposed arcuate portions for receiving the electric motors 23, which are bolted thereto, these motors having extending shaft portions 24 connected through suitable universal joints to the ends of pinion shafts 25, which project into the gear housings 26, containing the ring and pinion gears by which the axle shafts within the housings 9 are driven. Suitable brake mechanisms, indicated generally at 27, are provided for each of the axle shafts, and the wheels for such shafts are mounted at the ends of the axles inwardly of the journals for the shafts and on the inboard side of the side frame members 7, the wheels being indicated at 28.

Suitable journals are provided at the extending ends of the shafts, as described previously, the outer shell of these journals being received within the rubber sleeves 12, upon which the side frame members are supported, such journal assemblies being indicated generally at 74 in Figure 1.

To support the gear housings on the axle housings 9 against torque reactions caused by acceleration or braking, the gear housing portions 26 thereof have extending brackets 30 bolted or otherwise suitably secured thereto, which are adapted to receive cap members 32, encircling the transverse cross members 5. Suitable rubber sleeves or bushings 33 are interposed between the inner peripheries of the extending brackets 30 and adjacent outer peripheries of the cross shafts 5, whereby the housing is resiliently cushioned against torque reactions by connection to the cross members.

The car body of the vehicle is supported through a center plate mounted upon a transversely extending bolster member indicated generally at 34 in Figure 1, which bolster has enlarged end portions 35. Mounted on the bolster 34 adjacent the enlarged ends 35 thereof are rubber bumper elements 42, adapted upon transverse oscillation of the bolster to abut against the portion 43 of a reaction member, indicated generally at 46, this member extending above the frame member 7, and having inwardly extending opposed arm portions 44 and being secured to the top of the arched portions 8 of the side frame member as indicated at 45 in Figure 2.

Suitable rubber cushioning elements, indicated at 90 in Figure 2, and bearing against the sides of the bolster ends 35, are adapted to be held within recessed bosses 92, carried by the opposed arms 44 for cushioning the bolster against movement in the longitudinal plane of the truck. Each end of the bolster is thus arranged for cushioned support in a longitudinal direction between the extending arms 44 of the member 43.

Secured to the under surface of the bolster end 35 as shown in Figure 2, is a plurality of vertically arranged spring elements consisting of rubber elements or cushions, carried between thin metal plates to which opposite sides of the cushions are vulcanized and indicated as a unit by the reference numeral 78, which unit is adapted to rest upon a base portion 79 of a generally U-shaped cradle member, having its opposite ends formed into extending cap portions 80, extending fore and aft of the vehicle above the side frame member 7. The cap portions 80 of this cradle member, in turn, are adapted to be supported through a corresponding plurality of rubber cushioning elements 82, which, in turn, are supported upon suitably flatted portions of the cradle portion 83 of the sub-frame assembly 20.

Thus, it will be apparent that the vertical load upon the bolster 34 is transmitted through the cushioning unit 78, to the cradle 79, and thence through the cushioning units 82 to the cradle 83. From this point, the load is transmitted through the cap portions 84 of the members 20 into a double coiled spring element 85—86, shown at the right hand side of Figure 2, or as an optional arrangement, a heavy coil spring element 87 and rubber cushioning element 88, adapted to bottom upon a pedestal 89, carried on the side frame member 7, as shown at the left hand side of Figure 2. In either event, the spring elements 85—86 or 87—88 are disposed at and seated against the end portions of the transverse member 20, directly below the extending arm portions 76 of the member 43, and the load from the bolster is thereby transmitted to the side frame members 7 and thence to the axles.

The side frame members 7, are also arranged to provide a support at their journal mountings upon the axle shafts, for a laterally outwardly extending track contact shoe (not shown), adapted to engage the third rail or power rail of the electric system for the vehicle. The contact shoe is adapted to be carried upon a beam member 72, shown in Figure 1, which beam member is provided with connecting brackets at each of its ends, as at 73, adapted to be connected to and supported upon the end closure plate 74, enclosing the journal bearings for the shafts, which are journalled within the side frame members 7 and extend outwardly from the wheels 28.

There is also provided a horizontally arranged shock absorbing member comprising the member 75, which at its opposite ends is pivotally mounted through suitable rubber bushings to a bracket 76 carried adjacent to the center of the bolster 34 and a second bracket 77 secured to one of the arms 44 of the reaction member 43.

It is therefore believed that I have provided a rail truck of the class described, in which the axles are supported against movement out of parallel relationship by a rectangular frame member disposed about the outboard sides thereof, which frame member, however, at diagonally opposed points, provides for limited rocking action to accommodate the truck to track irregularities, without imposing any appreciable stress on the truck frame. Similarly, the present construction also provides for absorbing the reaction between the frame and the axle housing, inasmuch as the corresponding members of the frame can thus form the anchor for the axle housing.

I claim:

1. A rail truck including a pair of driving axles, a substantially rectangular main frame comprising a pair of side frame members having central depressed portions provided with two pairs of arched ends with one diagonal pair of ends being disposed over the ends of each of said axles, a first pair of short projecting arms connected at their one ends to said one diagonal pair of arched ends to form journal supports for one diagonal pair of axle ends, a second pair of short projecting arms adapted at their one ends to provide journal supports for the other diagonal pair of axle ends, the other diagonal pair of said arched ends being resiliently supported on said second pair of short projecting arms, and pin connections between said second pair of short projecting arms and said other pair of arched ends of said central portions of said side frame members.

2. A rail car truck including a pair of axles, a substantially rectangular main frame having a pair of longitudinally extending side frame members, a first pair of short projecting arms connected at their one ends to one diagonal pair of ends of said side frame members to form journal housings for one diagonal pair of axle ends, journal means for the other diagonal pair of axle ends, a second pair of short projecting arms, said journal means being mounted for limited rotative movement in said second pair of short projecting arms, and the other diagonal pair of ends of said side frame members being pivotally mounted to said second pair of short projecting arms.

3. A rail car truck including a pair of axles, a substantially rectangular main frame having a pair of longitudinally extending side frame members, a pair of short projecting arms, said axles at their one diagonal pair of ends being journaled in one diagonal pair of ends of said side frame members and at their other diagonal pair of ends in said short projecting arms, and the other diagonal pair of ends of said side frame members being pivotally mounted to said short projecting arms about axes spaced from the axes of said axles.

4. A rail car truck including a pair of axles, a substantially rectangular main frame having a pair of longitudinally extending side frame members, a pair of short projecting arms, said axles at their one diagonal pair of ends being journaled in one diagonal pair of ends of said side frame members and at their other diagonal pair of ends in said short projecting arms, and the other diagonal pair of ends of said side frame members being pivotally mounted to said short projecting arms about axes spaced vertically above and to one side of the axes of said axles.

References Cited in the file of this patent

UNITED STATES PATENTS

| | | |
|---|---|---|
| 1,813,141 | Bethel | July 7, 1931 |
| 2,184,102 | Piron | Dec. 13, 1939 |
| 2,231,195 | Piron | Feb. 11, 1941 |
| 2,251,258 | Alden et al. | Aug. 5, 1941 |